Oct. 13, 1964　　　　　P. E. OLSON　　　　　3,152,615
MULTI-POSITION SELECTOR VALVE DEVICE
Filed Aug. 21, 1961　　　　　　　　　　　　　3 Sheets-Sheet 1
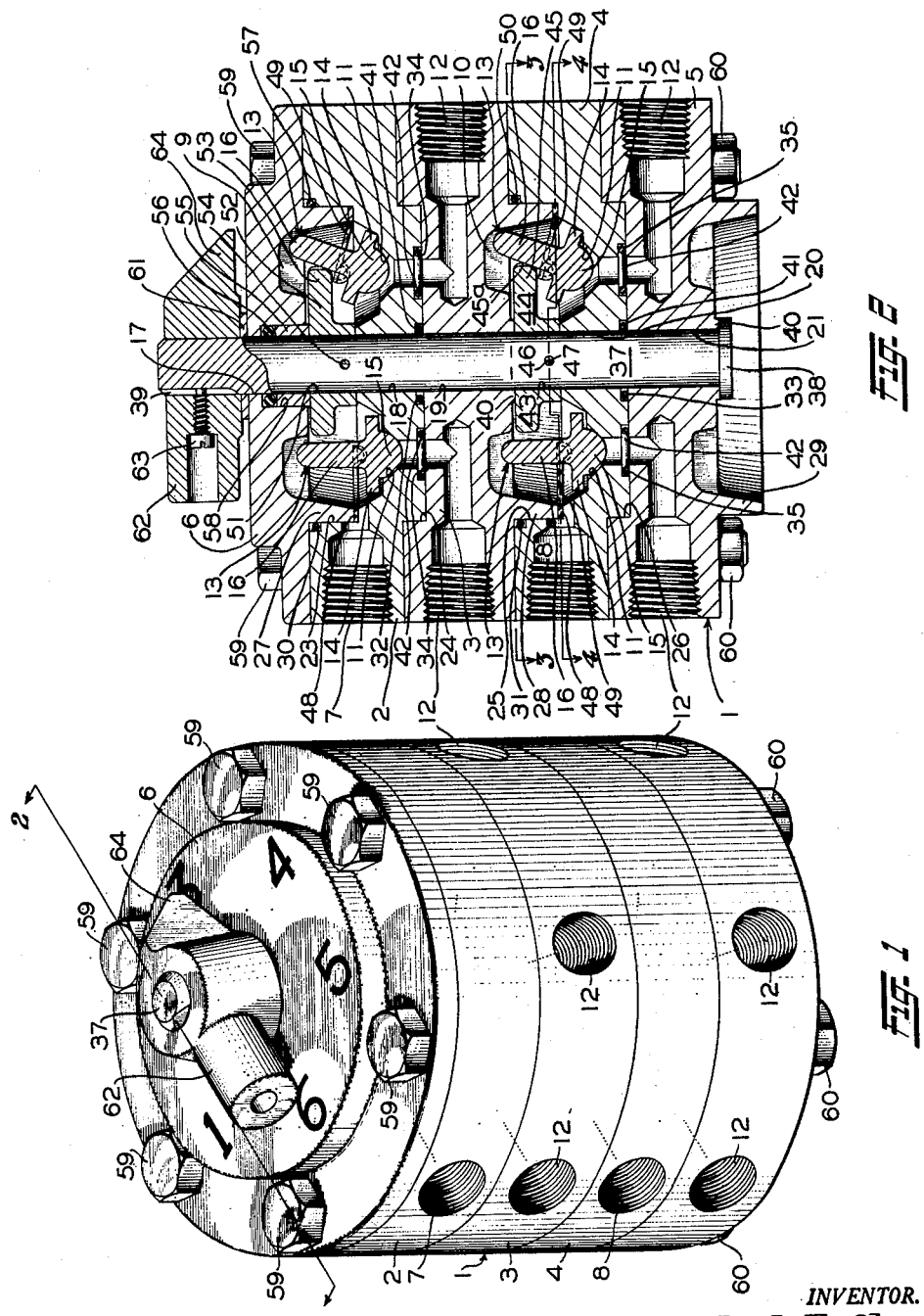
INVENTOR.
Paul E. Olson
BY
A. A. Steinmiller
Attorney

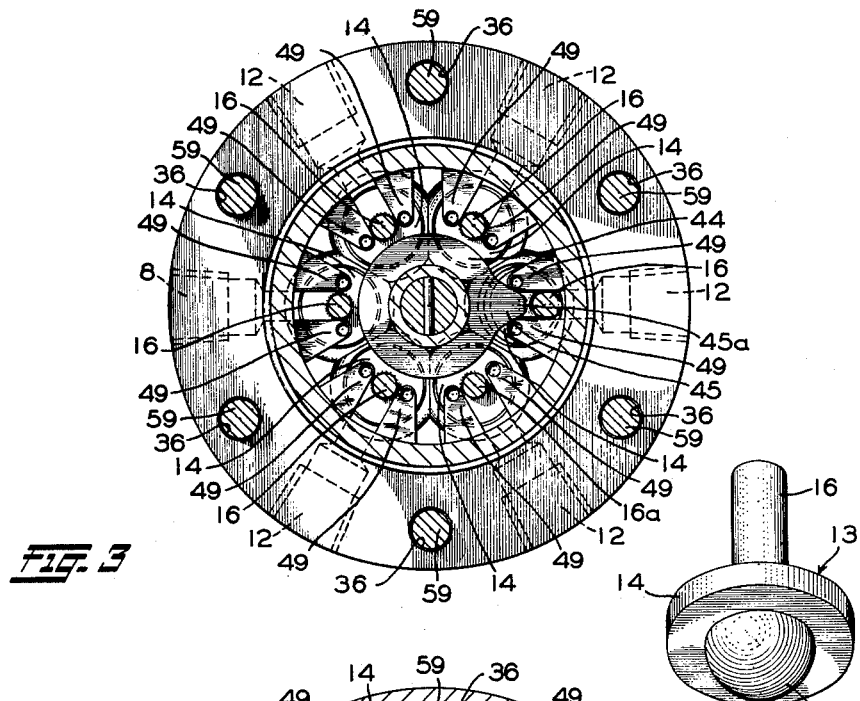
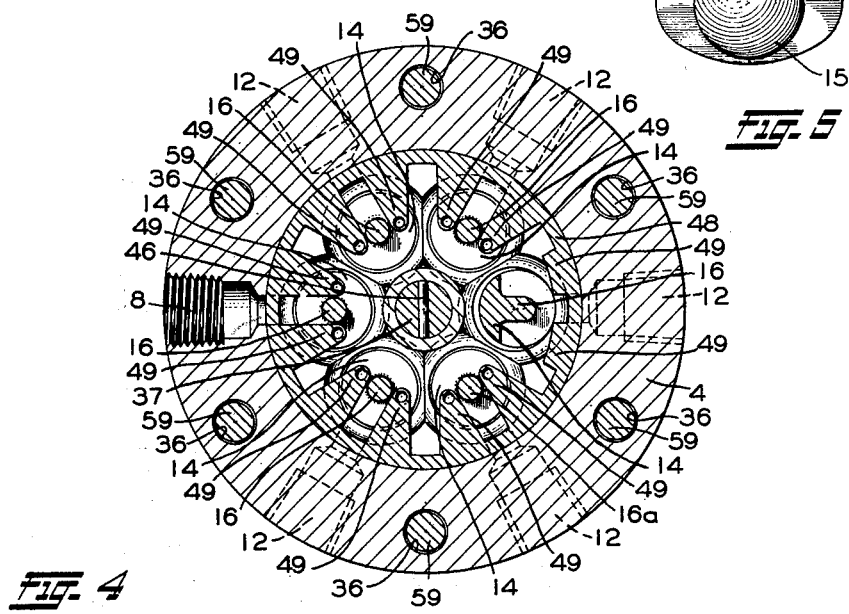

Oct. 13, 1964          P. E. OLSON          3,152,615
MULTI-POSITION SELECTOR VALVE DEVICE
Filed Aug. 21, 1961          3 Sheets-Sheet 3
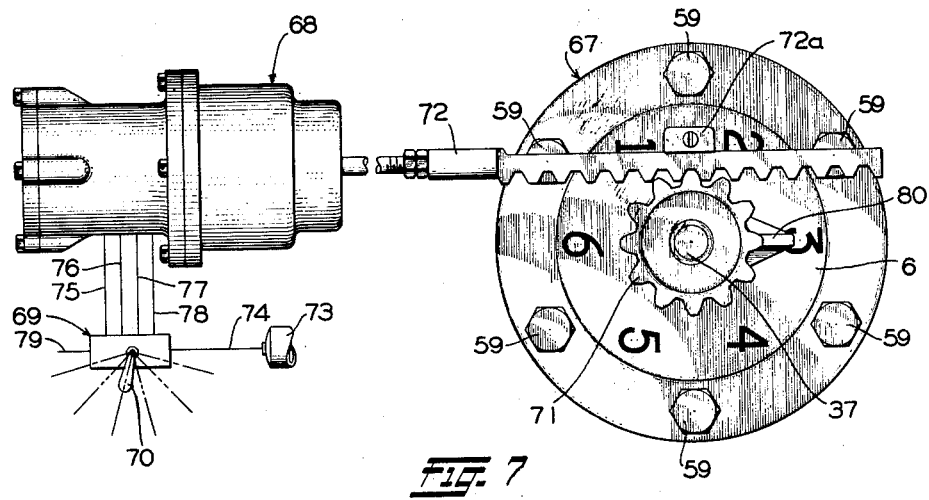
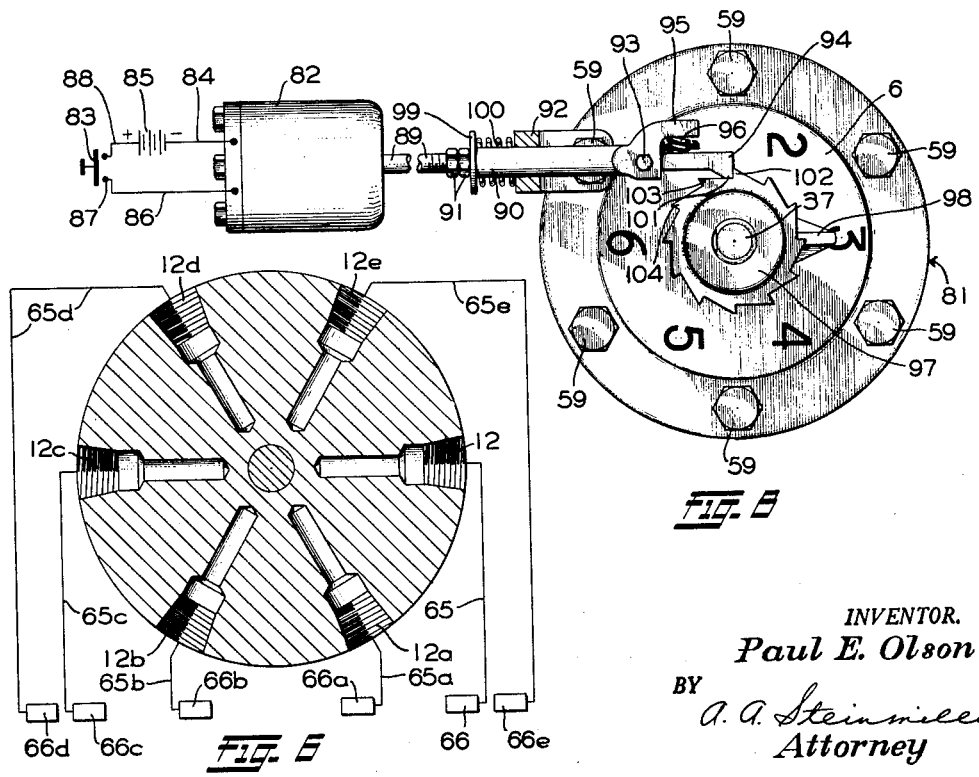
INVENTOR.
Paul E. Olson
BY
A. A. Steinmeier
Attorney

United States Patent Office 3,152,615
Patented Oct. 13, 1964

3,152,615
MULTI-POSITION SELECTOR VALVE DEVICE
Paul E. Olson, Pittsburgh, Pa., assignor to Westinghouse Air Brake Company, Wilmerding, Pa., a corporation of Pennsylvania
Filed Aug. 21, 1961, Ser. No. 132,723
11 Claims. (Cl. 137—627)

This invention relates to a manually or power operated multiple position selector control valve device, and more particularly to a manually or power operated multiple selector control valve device having two or more multivalve units in which the valves in each unit are cam operated selectively, one at a time, by corresponding cams mounted on a common shaft.

There are presently on the market both manually and power operated control valve devices of the type in which a multi-position valve element establishes, in each position, a fluid pressure communication between a source of fluid under pressure and one of a plurality of delivery conduits.

To connect two or more control valve devices of this type so that they can be simultaneously operated by a single manually operated handle or by power whereby each control valve device in each of a plurality of its positions establishes a fluid pressure communication between a source of fluid under pressure and a delivery conduit would require a gear train comprising two or more gears or a cumbersome mechanical linkage in each of which high and undesirable frictional forces would be encountered.

In some installations, such as in natural gas distribution systems, where one or more engine driven fluid compressor units are operated in accordance with the demand, it is very important to avoid prolonged periods of idleness of any one of the compressor units.

Accordingly, it is the general purpose of this invention to provide a novel, lightweight, compact, inexpensive and simplified multiple unit manually or power operated selector control valve device to successively effect operation of, such as, the different compressor units one at a time to produce equal wear on the different units in one or more compresser installations in a gas distribution system.

Furthermore, one valve unit of the multiple unit manually or power operated selector control valve device may be used, for example, to successively effect operation of, such as, the different compressor units as the lead unit in one compressor installation while another valve unit may control the starting of another compressor unit in the same installation in response to the demand or load on the lead unit exceeding the capacity of the lead unit.

Essentially, the multiple unit manually or power operated selector control valve device of the present invention comprises one or more coaxially arranged valve units each of which comprises a sectionalized casing consisting of two casing sections disposed one above the other in a stack, one of the two casing sections having six radially arranged and arcuately spaced valve seats therein with which a spherical poppet type of valve cooperates to cut off or establish a communication between a common supply conduit and a corresponding delivery conduit. More specifically, the selector control valve device of the present invention further comprises an operating shaft on which is mounted in spaced-apart parallel relation one or more cams corresponding to the number of valve units, the contour of each cam being such as to provide for successively tilting the corresponding spherical valves one at a time from their seats as the operating shaft is rotated from one position to an adjacent position by a manually operated handle or power means operatively connected to the operating shaft. Each spherical poppet valve is provided with a leaf type spring means for returning the valve to its seated position subsequent to movement of the corresponding cam out of contact with a stem formed integral with the respective spherical valve.

Each pair of casing sections is so formed that each casing section can be disposed between two other identical pairs of casing sections so that the pairs of casing sections can be arranged in a stack to provide for operation by a single shaft of as many groups of six valves each as may be desired in any particular installation or distribution system.

In the accompanying drawings:

FIG. 1 is an isometric elevational view of a manually operated multiple positions selector control valve device comprising a stack of four coaxially arranged casing sections the operating cams for the six valves of each pair of casing sections that form one multi-valve unit being mounted on a common operating shaft.

FIG. 2 is a vertical cross-sectional view, taken on a plane through the line 2—2 of FIG. 1, looking in the direction of the arrows, and showing details of certain of the spherical type valves and their relative positions with respect to their corresponding casing section in both their seated and unseated position.

FIG. 3 is a cross-sectional view, taken along the line 3—3 of FIG. 2, looking in the direction of the arrows, and showing details of an upper cam element and the relative position of the stem of one spherical valve unseated thereby with respect to the stems of the remaining five seated valves of one valve unit.

FIG. 4 is a cross-sectional view, taken along the line 4—4 of FIG. 2 looking in the direction of the arrows, and showing details of the spherical valves and the relative position of one spherical valve when unseated with respect to the remaining five seated valves of another valve unit.

FIG. 5 is an isometric elevational view showing the details of one of the spherical type valves.

FIG. 6 is a diagrammatic view showing how each one of the multi-valve units of the multiple selector control valve device may be connected to the starting mechanisms of six diesel engines.

FIG. 7 is a plan view of a fluid pressure operated multiple selector control valve device, the selector control valve device being substantially the same as that shown in FIGS. 1, 2, 3 and 4 but power operated by a manually controlled fluid motor through a rack and a spur gear or pinion.

FIG. 8 is a plan view of a solenoid operated multiple selector control valve device, the selector control valve device being substantially the same as that shown in FIGS. 1, 2, 3 and 4 but power operated by a manually controlled solenoid through a pawl and ratchet mechanism.

*Description—FIGS. 1 to 5*

Referring to FIGS. 1 and 2 of the drawings, there is shown a manually operated multiple selector control valve device 1 embodying the invention, which valve device is illustratively shown as arranged for selectively controlling the supply of fluid under pressure from a source of supply of fluid under pressure, such as a reservoir (not shown), to any one of a first set of delivery conduits (not shown), and from this source of supply or a second and separate source of supply of fluid under pressure, to any one of a second set of delivery conduits (not shown).

The control valve device 1 preferably comprises four coaxial generally cylindrical casing sections 2, 3, 4 and 5 arranged in a stack one upon another as clearly shown in FIGS. 1 and 2. The casing sections 2 and 3 together with a cover 6 constitute a first selector valve unit. The casing sections 4 and 5 in cooperation with the casing section 3 constitute a second selector valve unit. It should be noted that the casing sections 2 and 4 are identical and also that the casing sections 3 and 5 are identical. Therefore, the casing section 5 is adapted to cooperate with two other casing sections (not shown) which could be identical with the casing sections 2 and 3 or 4 and 5 to constitute a third selector valve unit (not shown).

From the above, it is apparent that as many selector valve units as may be desired can be arranged in a stack and that each selector valve unit comprises two casing sections that are identical to the two casing sections constituting each of the other selector valve units.

There is a single tapped port 7 opening at the peripheral surface of the casing section 2 and into which may be received one threaded end of a pipe (not shown) that, for example, may be connected at its opposite end to a source of supply of fluid under pressure (not shown). Likewise, there is a single tapped port 8 opening at the peripheral surface of the casing section 4 and into which may be received one end of a pipe (not shown) that, for example, may be connected at its opposite end to the above-mentioned source of supply of fluid under pressure or it may be connected to a separate source of supply of fluid under pressure or to a device operated by fluid under pressure. The tapped ports 7 and 8, respectively, are connected by corresponding passageways in the respective casing sections 2 and 4 to chambers 9 and 10. The chamber 9 is formed between the upper end of the cylindrical casing section 2 and the cover 6 and the chamber 10 is formed between the lower end of the cylindrical casing section 3 and the upper end of the cylindrical casing section 4. It may be noted that the lower end of the casing section 5 is adapted to cooperate with the upper end of a cylindrical casing section (not shown) which may be identical to the casing sections 2 and 4 to form a chamber in a third selector valve unit (not shown) which chamber would correspond to the chamber 9 or 10.

The identical cylindrical casing sections 2 and 4 are each provided on their upper end with six equally spaced-apart radially arranged identical conical valve seats 11. The six valve seats 11 of each of the casing sections 2 and 4 are connected by corresponding passageways extending through the respective casing sections 2 and 3, and 4 and 5 to six corresponding radially arranged ports 12 opening at the peripheral surface of the respective casing sections 3 and 5, only three in each casing section appearing in FIG. 1. A valve 13 is provided for cooperation with each of the valve seats 11 of each casing section. As shown in FIG. 5, each valve 13 comprises a disc 14 from one side of which extends a spherical portion 15. Extending from the other or opposite side of the disc 14 of each valve 13 is a valve stem 16 by which the valve can be tilted from its respective seat in a manner hereinafter described.

The cover 6 and the casing sections 2, 3, 4 and 5 are, respectively, provided with coaxial bores 17, 18, 19, 20 and 21. Furthermore, the casing sections 2, 3, 4 and 5 are provided respectively with counterbores 23, 24, 25 and 26 which are coaxial with the respective bores 18, 19, 20 and 21 and of larger diameter. The cover 6 and the casing sections 3 and 5 are respectively provided on the lower ends thereof with corresponding cylindrical skirt portions 27, 28 and 29. The casing sections 2 and 4 are provided on their upper ends respectively with counterbores 30 and 31 which are coaxial with the respective counterbores 23 and 25 and slightly larger in diameter. The lower ends of each of the casing sections 2 and 4 are provided respectively with counterbores 32 and 33 which are coaxial with the respective counterbores 18 and 20 and slightly larger in diameter. The lower end of the casing section 2 is also provided with six radially arranged counterbores 34 which are coaxial with the six valve seats 11 formed at the upper end of this casing section and surround the corresponding passageways extending from the valve seats 11 through the casing section 2 to the lower end thereof. Likewise, the lower end of the casing section 4 is provided with six radially arranged counterbores 35 which are coaxial with the six valve seats 11 formed at the upper end of this casing section and surround the corresponding passageways extending from these valve seats 11 through the casing section 4 to the lower end thereof.

The cover 6 and each of the casing sections 2, 3, 4 and 5 are provided with six radially arranged and equally spaced-apart bores 36, as shown in FIGS. 3 and 4.

The multiple selector control valve device 1 shown in FIGS. 1 to 4, inclusive, comprises a number of parts which are assembled as follows:

First, a cam operating shaft 37, having a collar 38 at one end and a keyway 39 at the other end, has the end having the keyway pushed through the bore 21 in the casing section 5 until the collar 38 rests against a boss 40 formed on the lower end of the casing section 5, it being understood that the casing section 3 has a corresponding boss. Next, an O-ring seal 41 is placed in the counterbore 33 formed in the casing section 4 after which six O-ring seals 42 are placed in the six counterbores 35 also formed in the lower end of the casing section 4. Thereafter, the keyway end of the cam operating shaft 37 is inserted through the O-ring seal 41 and the bore 20 in the casing section 4 and this casing section then pushed in the direction of the casing section 5 until the O-ring seals 41 and 42 contact the bottom of the counterbore 26. The casing section 4 is next rotated until the bores 36 therein are in alinement with the corresponding bores 36 in the casing section 5. Subsequent to the O-ring seals 41 and 42 contacting the bottom of the counterbore 26 and the alinement of the bores 36 in the two casing sections, the keyway end of the operating shaft 37 is introduced into the lower end of a bore 43 extending through a first valve operating cam member 44 having a single rise 45 which has therein a detent recess 45a (FIG. 3). The valve operating cam member 44 is then shoved or forced downward until it contacts the upper end of the casing section 4 after which the O-rings 41 and 42 are compressed to form a seal as the lower end of the casing section 4 is brought into metal to metal contact with the bottom of the counterbore 26. In this position, the cam member 44 is locked to the cam operating shaft 37 by a first pin 46 that is inserted through a bore 47 that now extends through the cam member 44 and the cam operating shaft 37.

Following locking the valve operating cam member 44 to the cam shaft 37, the cam member 44 is turned by manually rotating the shaft 37 to a position so that the single rise 45 on the cam member 44 will be substantially midway between two of the radially arranged valve seats 11 provided on the upper end of the cylindrical casing section 4. With the cam member 44 in this position, a valve 13 is placed on each of the six valve seats 11.

When the six valves 13 have been placed on their respective seats 11, a first thin flat ring 48, constructed of, for example, spring steel and having substantially the same outside diameter as the counterbore 25 and twelve inwardly extending and equally spaced-apart substantially triangular shaped fingers 49, is lowered over the keyway end of the cam operating shaft 37 to some position above the ends of the six stems 16 of the six valves 13 and then turned to a position such that, upon subsequently lowering it into the counterbore 25 until it contacts the annular shoulder formed by the lower end thereof, the six valve stems 16 are disposed between alternate pairs of the inwardly extending spring steel fingers 49. Each alternate pair of resilient fingers 49 thus form therebetween a guide slot for the respective valve stem 16 and overlie the upper side of the disc 14 of a corresponding valve 13 whereby the corresponding valve 13 can be tilted from its seat 11 against the bias of two spring steel fingers 49 of the ring 48 since, as the operating cam member 44 is substantially rotated, the rise 45 thereon will successively contact the six stems 16 and move them outward in their respective slots formed by and between a pair of fingers 49 so that the lower edge of the respective disc 14 midway the portion of the disc lying below the respective slot becomes a fulcrum for the entire corresponding valve 13 about which it is tilted from its respective seat 11 to an unseated position.

After flat ring 48 has been lowered into contact with the annular shoulder formed by the lower end of the counterbore 25, an O-ring seal 50 is positioned within the counterbore 31 formed in the upper end of the casing section 4.

Now the keyway end of the cam operating shaft 37 is introduced into the bore 19 in the casing section 3 after which this casing section is moved downward along the shaft 37 in the direction of the casing section 4, as viewed in FIG. 2, until the lower end of the skirt portion 28 of casing section 3 contacts the upper side of the flat ring 48. The casing section 3 is next rotated until the bores 36 therein are in alinement with the bores 36 in the casing sections 4 and 5 to facilitate securing the various casing sections together in a manner hereinafter explained.

Since the casing section 2 is identical to the casing section 4, an O-ring seal identical to the O-ring seal 41 is now placed in the counterbore 32 in the lower end of the casing section 2 after which six O-ring seals, identical to the O-rings seals 42, are placed in the six radially arranged counterbores 34 in the casing section 2.

When an assembly comprising the casing section 2, an O-ring seal 41, and six O-ring seals 42, has been assembled, as described above, the keyway end of the cam operating shaft 37 is inserted through the O-ring seal 41 and the bore 18 in the casing section 2, and this casing section then moved along the operating shaft 37 toward the casing section 3 until the O-ring seals 41 and 42 carried by the casing section 2 contact the bottom of the counterbore 24 in the casing section 3.

Next, the keyway end of the operating shaft 37 is introduced into the lower end of a bore 51 that extends through a second valve operating cam member 52 which may be identical to the first valve operating cam member 44 so that each lower valve 13 and the corresponding upper valve 13 located directly above it will be simultaneously tilted from their corresponding seats 11 as the cam operating shaft 37 is rotated (see the right-hand upper and lower valves 13 in FIG. 2), or the single rise 53 on the valve operating cam member 52 may be arcuately spaced about the periphery of the cam member 52 to another position so that any one of the other five upper valves 13 will be tilted from its corresponding seat 11 at the same time as the right-hand lower valve 13 shown in FIG. 2 is tilted from its corresponding seat 11. The second valve operating cam member 52 is then pushed downward along the cam operating shaft 37 until it contacts the upper end of the casing section 2 after which an increase in the downwardly acting force is effected to compress the O-ring seals 41 and 42 carried by the casing section 2 to form a seal therebetween and the casing section 3 as the lower end of the casing section 2 is forced into metal to metal contact with the bottom of the counterbore 24 in the casing section 3. The valve operating cam member 52 is now locked to the cam operating shaft 37 by a second pin 54 in the same manner as the cam member 44 is locked to this shaft by the pin 46.

After the valve operating cam member 52 is locked to the shaft 37 by the pin 54, the shaft 37 is rotated until the rise 53 on the valve operating cam member 52 is substantially midway between two of the radially arranged valve seats 11 provided on the upper end of the casing section 2. While the cam member 52 is in this position, a valve 13 is placed on each of the six valve seats 11 on casing section 2.

Next, a sleeve 55 is slipped downward over the keyway end of the cam operating shaft 37 until the lower end of this sleeve abuts the upper side of the valve operating cam member 52. Likewise, an O-ring seal 56 is now slipped downward over the keyway end of the shaft 37 until the O-ring seal 56 abuts the upper end of the sleeve 55.

Subsequent to placing the sleeve 55 and the O-ring 56 in surrounding relation to the shaft 37, a second thin flat ring 48, identical to the first flat ring 48, is lowered over the keyway end of the shaft 37 in such an angular position that the six valve stems 16 of the upper set of valves 13 will pass between alternate pairs of the inwardly extending fingers 49 until the lower side of the ring 48 rests against the bottom of the counterbore 23 in the casing section 2. As explained in connection with the first flat ring 48, each alternate pair of fingers 49 of the second flat ring 48 form therebetween a guide slot for the respective valve stem 16 of the six upper valves 13 and overlie the upper side of the disc 14 of a corresponding valve 13.

Following lowering of the second flat ring 48 into contact with the bottom of the counterbore 23, an O-ring seal 57 is placed within the counterbore 30 in the casing section 2.

After the O-ring seal 57 has been placed within the counterbore 30, the keyway end of the cam operating shaft 37 is inserted through the bore 17 in the cover 6 and the cover then moved along the shaft in the direction of the casing section 2 until the bottom of the skirt portion 27 on the cover 6 contacts the upper side of the second flat ring 48, it being understood that the cover 6 is provided with a counterbore 58, coaxial with the bore 17 therein, which counterbore 58 is of sufficient depth to receive the sleeve 55 and the O-ring 56 so that the O-ring 56 is sufficiently compressed when the skirt portion 27 contacts the second flat ring 48 as to form a seal about the cam operating shaft 37 to prevent leakage therealong from the chamber 9 to atmosphere.

The cover 6 and the stack of casing sections 2, 3, 4 and 5 are now fastened together to form a single unit by first inserting a cap screw 59 through each of the six sets of aligned bores 36 in the cover 6 and the respective casing sections 2, 3, 4 and 5 and then securing a nut 60 to the lower end of each cap screw 59. As the nuts 60 are tightened, the cover 6 and casing sections 2, 3, 4 and 5 are clamped together thereby compressing the various O-ring seals 41, 42, 50, 56 and 57 to cause these O-ring seals to provide a plurality of seals about the shaft 37, between the various adjacent casing sections and between the casing section 2 and cover 6.

After the cover 6 and the casing sections 2, 3, 4 and 5 have been secured together by the cap screws 59 and nuts 60, a washer 61 is slipped over the keyway end of the cam operating shaft 37 and dropped downward, as viewed in FIG. 2, into contact with the upper or outside surface of the cover 6. Thereafter, an operating handle 62 is secured to the portion of the shaft 37 extending above the washer 61 by means of a set screw 63 that has at one end a portion of reduced diameter that is received in the keyway 39 in the shaft 37.

*Operation—FIGS. 1 to 4*

In operation, let it be assumed that a storage reservoir (not shown) is charged with fluid to some chosen pressure, such as one hundred pounds per square inch. Let it be further assumed that this reservoir is connected by suitable piping (not shown) to the tapped ports 7 and 8 in the respective casing sections 2 and 4 so that the respective chambers 9 and 10 are supplied with fluid under pressure at one hundred pounds per square inch. Furthermore, let it be assumed that the handle 62 and the valve operating cam members 44 and 52 of the multi-selector control valve device 1 occupy their No. 3 position as indicated by a pointer 64, disposed at one end of the handle 62, overlying a numeral 3 cast or stenciled on the cover 6, as shown in FIG. 1, to indicate the No. 3 position of the handle.

Whenever the handle 62 is moved to its No. 3 position, it is effective through the cam operating shaft 37 to rotate the valve operating cam members 44 and 52 to a corresponding position so that the respective cam rises 45 and 53 on these cam members acting through corresponding valve stems 16, which are normally disposed in slots formed between two adjacent fingers 49 so as to be in the arcuate path of these rises, tilt or rock the corresponding upper and lower valves 13 against the bias of the corresponding fingers 49 acting on the upper side of the disc 14 of these valves about a point on the periphery of the lower edge of the disc 14 of each respective valve 13 from a seated position on their respective conical valve seats 11 to an unseated position, in which the upper and lower right-hand valves 13 are shown in FIG. 2, since the stems 16 are restrained to move in their respective slots.

When the upper right-hand valve 13, shown in FIG. 2, is thus unseated, a corresponding passageway is established through which fluid under pressure is conveyed from the chamber 9 in the upper selector control valve unit, and hence the storage reservoir, to the corresponding right-hand passageway and port 12 in the casing section 3 which port 12 may be connected by a delivery conduit or pipe 65, as shown in FIG. 6, to a place of use of fluid under pressure which, for example, may be the starting mechanism of one engine driven fluid compressor unit 66 in a first multiple unit installation of six engine driven fluid compressor units in a gas distirbution system. Also, when the lower right-hand valve 13, shown in FIG. 2, is thus unseated, a corresponding passageway is established through which fluid under pressure is conveyed from the chamber 10 in the lower selector control valve unit, and hence the storage reservoir, to the corresponding right-hand passageway and port 12 in the casing section 5 which port 12 may be connected by a second delivery conduit or pipe (not shown) corresponding to the conduit or pipe 65 to a place of use of fluid under pressure which, for example, may be the starting mechanism of one engine driven fluid compressor unit 66 in a second multiple unit installation of six engine driven fluid compressor units in the gas distribution system. Consequently, when the upper and lower valves 13, shown in FIG. 2, are unseated, as shown, two engine driven compressor units, one in each of the two multiple unit installations, will be started simultaneously to effect compression of gas to meet the demand therefor in the gas distribution system.

Each of the remaining five delivery ports in the respective casing sections 3 and 5, which ports may be indicated by such as the five reference numerals 12a, 12b, 12c, 12d and 12e in the diagrammatic view shown in FIG. 6, may be respectively connected by five corresponding delivery conduits or pipes, which may be indicated by such as the five reference numerals 65a, 65b, 65c, 65d and 65e in the diagrammatic view, to a place of use of fluid under pressure which place of use, for example, may be respectively the starting mechanisms of the five engines of the remaining five-engine driven fluid compressor units in the first multiple unit installation of six-engine driven compressor units, and the starting mechanisms of the five engines of the remaining five-engine driven fluid compressor units in the second multiple unit installation of six-engine driven compressor units and indicated by such as the reference numerals 66a, 66b, 66c, 66d and 66e in FIG. 6.

With the six ports in the casing section 3 connected to the starting mechanisms of the six engines of the six-engine driven fluid compressor units in the first multiple unit installation, and the six ports in the casing section 5 connected to the starting mechanisms of the six engines of the six-engine driven fluid compressor units in the second multiple unit installation, let it be supposed that the handle 62 is manually moved to its No. 3 position in which position it is shown in FIG. 1 and 2 of the drawings.

Whenever the handle 62 is moved to its No. 3 position, the cam members 44 and 52 and the respective rises 45 and 53 thereon acting through the corresponding valve stems 16 of the respective right-hand lower and upper valves 13, shown in FIG. 2, rock these valves 13 to their unseated position in which position they are shown in FIG. 2. The detent recess 45a in the respective rises conforms to the valve stem of the valves 13 and thus serves to releasably hold the handle 62 in the No. 3 position. When each of these valves 13 is thus unseated, a corresponding passageway is established through which fluid under pressure is conveyed from the respective chambers 10 and 9 in the respective multi-valve units of the multiple selector control valve device 1 which chambers are connected to the storage reservoir, to two pipes corresponding to the pipe 65 shown in FIG. 6 which two pipes are connected to two corresponding starting mechanisms of two engines corresponding to the engines of two engine driven compressor units such as the engine driven compressor unit 66 in FIG. 6, it being understood that one of these two starting mechanisms is the hereinbefore-mentioned starting mechanisms of the one engine driven fluid compressor unit 66 in the first multiple unit installation and the other of these two starting mechanisms is the hereinbefore-mentioned starting mechanisms of the one engine driven compressor unit 66 in the second multiple unit installation. Therefore when the handle 62 is manually moved to its No. 3 position, the engine driven compressor unit 66 in the first multiple unit installation that is connected to the right-hand port 12 in the casing section 3, as shown in FIG. 2, will be started, and the engine driven compressor unit 66 in the second multiple unit installation that is connected to the right-hand port 12 in the casing section 5 will also be started. Subsequent to starting, these two compressor units 66, one in each multiple unit installation, will operate to supply gas under pressure to meet the demand for gas under pressure.

In order to avoid prolonged periods of idleness of the remaining five-engine driven fluid compressor units in each multiple unit compressor installation, let it be supposed that, after a chosen interval of time, an operator manually turns the handle 62 in a clockwise direction, as viewed in FIGS. 1, 3 and 4, from its No. 3 position in which it is shown in which the pointer 64 overlies the numeral 3 on the exterior of the cover 6, to its No. 4 position in which the pointer 64 overlies the numeral 4 on the exterior of the cover. As the handle 62 is thus turned clockwise, the valve operating cam members 44 and 52 (FIG. 2) are likewise rotated clockwise whereupon the respective stems 16 of the right-hand lower and upper valves 13, shown in FIG. 2, first ride up out of the detent recesses in the respective rises 45 and 53 on these cam members against the bias of each respective pair of fingers 49 and are then biased by these pairs of fingers against the respective upper side of the rise 45 which upper side is shown in FIG. 3 and the corresponding upper side of the rise 53 which upper side does not appear in FIG. 3 since the cam member 52 and its corresponding rise 53 are disposed in spaced-apart parallel relation to and above the cam member 44, shown in FIG. 3. As the cam members 44 and 52 continue to rotate clockwise in response to the manual turning of the handle 62, the respective valve stems 16 are biased by the corresponding pair of fingers 49 via the disc 14 of the respective valves 13 against the respective rises 45 and 53 and ride down the upper sides of these rises so that the fingers 49 are rendered effective to seat the right-hand lower and upper valves 13, shown unseated in FIG. 2, on their respective valve seats 11. As the right-hand lower and upper valves 13, shown in FIG. 2, are thus seated on their respective valve seats 11, the supply of fluid under pressure from the chambers 9 and 10 to the starting mechanisms of the respective engines of the engine driven compressor units 66 in the two multiple unit installations is cut off. Consequently, the starting of these two compressor units 66 is no longer under the control of the multiple selector control valve device 1.

Continued rotation of the cam members 44 and 52 in a clockwise direction, subsequent to the seating of the right-hand lower and upper valves 13, shown in FIG. 2, brings the lower side of the rise 45 on cam member 44 into contact with the valve stem identified by the reference numeral 16a in FIG. 3. Likewise, the lower side of the rise 53 on cam member 52 is brought into contact with a valve stem (not shown) that is disposed directly above the valve stem 16a. Consequently, further clockwise rotation of the cam members 44 and 52 causes the respective rises 45 and 53 acting on the valve stem 16a and the valve stem disposed directly above it to tilt or rock the corresponding valves 13 to their unseated position as the valve stems are moved in their respective slots between two fingers 49 and into the detent recesses 45a in the respective rises 45 and 53. When each of these valves 13 is thus unseated, a corresponding passageway is established through which fluid under pressure is supplied from the respective chambers 10 and 9 in the respective multi-valve units of the multiple selector control valve device 1 which chambers are connected to the storage reservoir, to two pipes corresponding to the pipe 65a, shown in FIG. 6, which two pipes are connected to two corresponding starting mechanisms of two engines corresponding to the engine of the engine driven compressor unit 66a, shown in FIG. 6, it being understood that one of these two starting mechanisms is the starting mechanism of a second engine driven fluid compressor unit 66a in the first multiple unit installation and the other of these two starting mechanisms is the starting mechanism of a second engine driven fluid compressor unit 66a in the second multiple unit installation.

After the two-engine driven fluid compressor units 66a have operated a chosen interval of time, the operator will manually turn the handle 62 in a clockwise direction, as viewed in FIGS. 1, 3 and 4, from its No. 4 position, in which the pointer 64 overlies the numeral 4 on the exterior of the cover 6, to its No. 5 position in which the pointer 64 overlies the numeral 5 on the exterior of the cover. As the handle 62 is thus turned clockwise, the valve operating cam members 44 and 52 are likewise rotated clockwise to effect seating of the two unseated valves 13 and the unseating of two other valves 13, one disposed above the other, in the same manner as has hereinbefore been explained.

Thus, as the two unseated valves 13 are reseated, the supply of fluid under pressure from the chambers 9 and 10 to the starting mechanisms of the respective engines of the two engine driven compressor units in the two multiple unit installations corresponding to the engine driven compressor unit 66a in FIG. 6 is cut off. Consequently, the starting of these two compressor units is no longer under the control of the multiple selector control valve device 1.

The unseating of the above-mentioned two other valves 13 establishes corresponding passageways through which fluid under pressure is supplied from the respective chambers 10 and 9 in the respective multi-valve units of the multiple position selector control valve device 1, which chambers are connected to the storage reservoir, to two pipes corresponding to the pipe 65b, shown in FIG. 6, which two pipes are connected to two corresponding starting mechanisms of two engines corresponding to the engine of the engine driven compressor unit 66b, shown in FIG. 6, it being understood that one of these two starting mechanisms in the starting mechanism of a third engine driven fluid compressor unit 66b in the first multiple unit installation and the other of these two starting mechanisms is the starting mechanism of a third engine driven fluid compressor unit 66b in the second multiple unit installation.

From the foregoing, it is apparent that the handle 62 can be rotated to any one of its six positions to effect in each position, unseating of a different pair of valves 13 to establish corresponding passageways through which fluid under pressure is supplied from the respective chambers 10 and 9 in the respective multi-valve units of the multiple selector control valve device 1, which chambers are connected to the storage reservoir, to two corresponding pipes which are connected respectively to two corresponding engine starting mechanisms of two engines of two engine driven fluid compressor units one of which units is one of six-engine driven fluid compressor units in one multi-unit installation in a gas distribution system and the other of which units is one of six-engine driven fluid compressor units in another multi-unit installation in the gas distribution system. Consequently, by periodically manually moving the handle 62 successively from one position to an adjacent position sequentially through its six positions, substantial uniform wear can be obtained of the six engine driven fluid compressor units in each of the two multi-unit installations in the gas distribution system.

It may be noted that instead of the multiple selector control valve device 1 controlling the simultaneous starting of two-engine driven compressor units, one in each of two multiple unit installations, as described above, this selector control valve device may be used to control the sequential starting of two engines in the same multiple unit installation so that the second compressor unit can be started when the demand for compressed gas exceeds the capacity of one compressor unit.

To use the multiple selector control valve device 1 to control the sequential starting of two engine driven compressor units in the same multiple unit installation, the port 7 in the casing section 2 (FIG. 2) would be connected by a first conduit or pipe (not shown) to a storage reservoir, and the right-hand port 12 in the casing section 3 would be connected by a second conduit (not shown), corresponding to the conduit 65 shown in FIG. 6, to the starting mechanism of one of the engine driven fluid compressor units. The right-hand port 12 in the casing section 5 would be connected by a suitable conduit or pipe (not shown) to a fluid pressure operated device (not shown) responsive to the load on the one engine driven fluid compressor unit exceeding the maximum capacity of this unit, and the port 8 in the casing section 4 would be connected by a suitable conduit or pipe (not shown) to the starting mechanism of another of the engine driven fluid compressor units in the same multiple unit installation.

With the multiple selector control valve device 1 connected, as just described, to two of the engine driven compressor units in one multiple unit installation, upon moving the handle 62 to its No. 3 position so that the upper and lower right-hand valves 13, shown in FIG. 2, are unseated, as shown, fluid under pressure would be supplied from the storage reservoir and the chamber 9 past the upper unseated valve 13 to the starting mechanism of the one engine driven fluid compressor unit to effect starting of this unit.

Subsequently, upon the demand for compressed gas exceeding the capacity of the one engine driven fluid compressor unit, the fluid pressure operated load responsive device would operate to supply fluid under pressure to the right-hand port 12, as shown in FIG. 2, in the casing section 5, thence past the now unseated lower right-hand valve 13 to the chamber 10 from whence it would flow via the port 8 in the casing section 4 and the conduit or pipe connected thereto to the starting mechanism of the above-mentioned another of the engine driven fluid compressor units in the same multiple unit installation. Accordingly, this compressor unit will be started so that both of the compressor units will henceforth operate to effect the supply of compressed gas to meet the increase in the demand therefor as long as this increased demand continues.

*Description—FIG. 7*

FIG. 7 of the drawings shows a second embodiment of the invention in which a mulitple selector control valve device 67 is power operated by a fluid motor 68 the operation of which is manually controlled by a manually operative control valve device 69 having an operating handle 70. Multiple selector control valve device 67 is identical in construction to mulitple selector control valve device 1 except the handle 62 of the multiple selector control valve device 1 is replaced by a pinion or gear 71 which is suitably secured to the cam operating shaft 37 in place of the handle 62.

The fluid motor 68 and the manually operative control valve device 69 may be substantially the same as those shown respectively in FIGS. 4 and 5 in Patent No. 3,035,549, issued May 22, 1962 to Ellis E. Hewitt, and assigned to the assignee of this application.

Briefly, the fluid motor 68 comprises one double-acting piston stop member and a pair of double-acting telescopically-arranged piston members, the smaller of which constitutes a double-acting power piston for operating the six-position multiple selector control valve device 67 through a rack 72 that is secured at one end to the double-acting power piston and meshes with the pinion 71 by being disposed between the pinion and a guide member 72a secured to the cover 6.

Fluid under pressure for effecting operation of the fluid motor 68 and thereby the multiple selector control valve device 67 under the control of the manually operative control valve device 69 is supplied from a storage reservoir 73 which is connected to the manually operative control valve device 69 by a pipe 74.

*Operation—FIG. 7*

In operation, let it be assumed that the storage reservoir 73 is charged with fluid under pressure to some chosen pressure, such as one hundred pounds per square inch. Further assume that the handle 70 and a rotary valve (not shown) of the manually operative control valve device 69, and the fluid motor 68 together with the rack 72 occupy their No. 3 position in which they are shown in FIG. 7 of the drawings. While in No. 3 position, cavities in the rotary valve connect the pipe 74 to a pipe 75 which is connected to the fluid motor 68 and the pipes 76, 77 and 78, which are connected to the fluid motor 68, to an atmospheric exhaust pipe 79.

As explained in detail in the hereinbefore-mentioned patent, the fluid under pressure thus supplied to the pipe 75 is effective on the above-mentioned piston stop member and on the piston member to effect movement of these members and the rack 72 to the position in which the rack 72 is shown in FIG. 7 of the drawings. When the rack 72 is thus moved to the position in which it is shown in FIG. 7, the pinion 71 is rotated to a corresponding position in which a pointer 80 that is formed integral with or is secured to the pinion 71 overlies the numeral 3 on the cover 6. When the pinion 71 is rotated to this position, the multiple selector control valve device 67 operates to open the same valves and to establish the same fluid pressure communications as when the handle 62 of the multiple selector control valve device 1, shown in FIGS. 1 and 2, is turned to its No. 3 position.

To effect clockwise rotation of the pinion 71 and the pointer 80 in a series of successive steps corresponding to the six positions of the multiple selector control valve device 67, the operator will turn the handle 70 of the manually operative control device 69 to six corresponding positions. When the handle 70 is turned to any desired position, the rotary valve operated thereby effects the supply of fluid under pressure to or vents fluid under pressure from one or more of the pipes 75, 76, 77 and 78 to cause operation of the fluid motor 68 to rotate the pinion 71 and pointer 80 to a corresponding position. Power rotation of the pinion 71 to its six different positions operates the multiple selector valve device 67 in the same manner as manual rotation of the handle 62 to its six different positions operates the multiple selector valve device 1.

*Description—FIG. 8*

FIG. 8 of the drawings shows a third embodiment of the invention in which a multiple selector control valve device 81 is power operated by a solenoid 82 the operation of which is manually controlled by a manually operative switch device 83. One end of the coil comprising the solenoid 82 is connected by a wire 84 to the negative terminal of a battery 85. The opposite end of the coil comprising the solenoid 82 is connected by a wire 86 to one terminal 87 of the switch device 83. The other terminal of the switch 83 is connected by a wire 88 to the positive terminal of the battery 85.

The solenoid 82 is provided with an operating plunger 89 that has an exterior threaded end having screw-threaded engagement with a threaded bore in one end of a pawl operating bar 90 to which it is locked by two lock nuts 91. The operating bar 90 is slidably supported in a guide bracket 92 that is secured to the exterior of the cover 6 by one of the cap screws 59.

Pivotally mounted, as by a pin 93, on the end of the pawl operating bar 90 opposite the lock nuts 91 is a pawl 94. Also mounted on the pin 93 is an offset arm 95 between which and the pawl 94 is disposed a spring 96 which is effective to bias the pawl 94 into engagement with a tooth on a ratchet wheel 97 that is secured to the shaft 37 of the multiple selector control valve device 81. The ratchet wheel 97 has formed integral therewith or secured thereto a pointer 98 that in the different angular positions to which the ratchet wheel 97 is rotated overlies one of the numerals on the exterior of the cover 6.

The pawl operating bar 90 is provided with a collar 99 on the end thereof adjacent the lock nuts 91 and a return spring 100 is interposed between the collar 99 and the guide bracket 92 for biasing the operating plunger 89, pawl operating bar 90 and pawl 94 to the position in which they are shown in FIG. 8 of the drawings when the coil of the solenoid 92 is deenergized.

*Operation—FIG. 8*

In operation, let it be assumed that the switch device 83 is open to effect deenergization of the operating coil of the solenoid 82. When the operating coil of the solenoid 82 is thus deenergized, the return spring 100 will bias the operating plunger 89, the pawl operating bar 90, and pawl 94 to the position in which they are shown in FIG. 8 in which a pawl tip 101 of the pawl 94 lies just to the left of and in contact with a tooth 102 on the ratchet wheel 97. In this position of the ratchet wheel 97, the pointer 98 thereon overlies the numeral 3 on the exterior of the cover 6 of the multiple selector control valve device 81. Consequently, the valve operating cam members and the valves within the multiple selector control valve device 81 occupy a corresponding position to effect the establishment of the same fluid pressure communications as are established when the handle 62 of the multiple selector control valve device 1, shown in FIGS. 1 and 2, is turned to its No. 3 position.

To effect clockwise rotation of the ratchet wheel 97 and the pointer 98 in a series of successive steps corresponding to the six positions of the multiple selector control valve device 81, the operator will manually close the switch device 83. When the switch device 83 is manually closed, a circuit is established for energizing the operating coil of the solenoid 82. This circuit extends from the negative terminal of the battery 85 through the wire 84, thence through the operating coil of the solenoid 82 and the wire 86 to the terminal 87. Since the switch device 83 is now closed, the circuit continues through the closed switch device 83 and the wire 88 to the positive terminal of the battery 85.

When the operating coil of the solenoid 82 is energized through the circuit just traced, the operating plunger 89, pawl operating bar 90 and the pawl 94 are moved in the direction of the right hand in response to the energization of the operating coil of the solenoid 82.

As the pawl 94 is moved in the direction of the right hand, it is effective through the tooth 102 on the ratchet wheel 97 to effect rotation in a clockwise direction of this ratchet wheel, the pointer 98 and the cam operating shaft 37 until the operating plunger 89 travels the full length of its stroke. The full length of the stroke of the operating plunger 89 is such that as the plunger 89 travels the full length of its stroke, the ratchet wheel 97 is rotated from a position in which the pointer 98 overlies the numeral 3 on the exterior of the cover 6 to a position in which the pointer 98 overlies the numeral 4 on the exterior of the cover.

Subsequent to the operating plunger 89 traveling the full length of its stroke, the operator will open the switch device 83 to effect deenergization of the operating coil of the solenoid 82. When the operating coil of the solenoid 82 is thus deenergized, the return spring 100 will become effective to move the operating plunger 89, pawl operating bar 90 and pawl 94 in the direction of the left hand until they reach the position in which they are shown in FIG. 8. As the pawl 94 is returned to this position, it is ratcheted over a tooth 103 which now occupies the position in which the tooth 102 is shown in FIG. 8.

Now whenever the operator desires to effect clockwise rotation of the ratchet wheel 97 and pointer 98 from the position in which the pointer 98 overlies the numeral 4 on the exterior of the cover 6 to the position in which the pointer 98 overlies the numeral 5 on the exterior of the cover 6, he will again close the switch device 83. When the switch device 83 is thus reclosed, the operating coil of the solenoid 82 is again energized through the circuit hereinbefore traced in detail. The operating plunger 89, the pawl operating bar 90 and the pawl 94 will move in the direction of the right hand in response to this energization of the operating coil 82 until the operating plunger 89 has traveled the full length of its stroke. Since the pawl 94 is in contact with the tooth 103 at this time, the pawl 94 will effect clockwise rotation of the ratchet wheel 97 from the position in which the pointer 98 overlies the numeral 4 on the exterior of cover 6 to the position in which the pointer 98 overlies the numeral 5 on this cover. After the pointer 98 has reached this position, the operator will reopen the switch device 83 whereupon the return spring will move the opening plunger 89, pawl operating bar 90 and pawl 94 in the direction of the left hand to the position in which they are shown in FIG. 8. As the pawl 94 is thus returned to the position in which it is shown in FIG. 8, it ratchets over a tooth 104 on the ratchet wheel 97.

From the foregoing, it is apparent that an operator by opening and closing the switch device 83 can effect clockwise rotation of the ratchet wheel 97 from one position to another position to operate the multiple position selector control valve device 81 successively through its six positions.

Having now described the invention, what I claim as new and desire to secure by Letters Patent, is:

1. A multi-position selector control valve device, comprising in combination, a sectionalized casing including a plurality of cooperating casing sections, a pair of which forms therebetween a chamber, one of said pair of casing sections having an inlet port communicating with said chamber, and a surface constituting one wall of said chamber in which wall are a plurality of valve seats arranged in a circle about a central axis of said cooperating casing sections and spaced-apart equal angles, a plurality of passageways opening respectively at one end within said valve seats and opening at the other end at one face of said one of said pair of casing sections, another of said casing sections having radially arranged therein a plurality of outlet ports corresponding in number to said valve seats and communicating respectively via corresponding passageway that opens at a face of said another casing section cooperating with the said one face of said one of said pair of casing sections and registers with the end of a corresponding passageway in the one of said pair of casing sections, a plurality of valves one for each of said valve seats, each valve being operable either to a seated or to an unseated position for controlling flow of fluid under pressure from said inlet port via said chamber and through a corresponding passageway to a corresponding outlet port, a rotatable cam member within said chamber, said cam member being rotatable on an axis coincident with the central axis of said casing sections and having a cam lobe thereon, said cam lobe cooperating successively with said valves to cause each individual valve to be successively unseated by said lobe in response to rotary movement of said cam member, and means connected to said cam member to rotate said cam member to different operating positions in each of which positions a corresponding one only of said valves is unseated.

2. A multi-position control valve device, as claimed in claim 1, further characterized by a single means for yieldingly biasing all of said valves to their respective seated positions.

3. A multi-position selector control valve device, as claimed in claim 1, further characterized in that each of said valves comprises a disc having a spherical surfaced portion extending from one side thereof for seating contact with a corresponding valve seat and a stem extending coaxially from the opposite side, and further comprising a single guide means having a plurality of pairs of resilient fingers, each pair providing for the stem of a corresponding valve a chosen path in which said stem must move incident to unseating of the corresponding spherical surfaced portion of the valve from its respective valve seat by cooperation of said cam lobe with the stem of the valve.

4. A multi-position selector control valve device, as claimed in claim 1, further characterized in that each of said valves comprises a disc having a spherical surfaced portion extending from one side thereof for contact with a corresponding valve seat and a stem extending from the opposite side, and further comprising a ring member having a plurality of pairs of resilient inwardly extending spaced-apart fingers, each pair of fingers overlying the stem side of a corresponding one of said discs and forming therebetween a guide means providing a straight line path in which a corresponding valve stem must move incident to the unseating of the corresponding spherical surfaced portion from its respective valve seat by cooperation of said cam lobe with the stem of each valve and effective to, through the intermediary of said corresponding disc, yieldingly bias said corresponding spherical surfaced portion in the direction of its respective valve seat.

5. A multi-position selector control valve device, comprising in combination a sectionalized casing including a plurality of cooperating casing sections, a pair of which forms therebetween a chamber, one of said pair of casing sections having an inlet port connected through a radially arranged passageway to said chamber, and a surface constituting one wall of said chamber in which wall are a plurality of valve seats arranged in a circle about a central axis of said cooperating casing sections and spaced-apart equal angles, a plurality of passageways opening respectively at one end within said valve seats and opening at the other end at one face of one of said pair of casing sections, another of said casing sections having radially arranged therein a plurality of outlet ports corresponding in number to said valve seats and communicating respectively via a corresponding passageway that opens at a face of said another casing section cooperating with the said one face one of the one of said pair of casing sections and registers with the end of a corresponding passageway in the one of said pair of casing sections, a plurality of valves, one for each of said valve seats, each valve having a stem extending from one side thereof and being operable either to a seated or to an unseated position for controlling flow of fluid under pressure from said inlet port via said chamber and through a corresponding passageway to a corresponding outlet port, a guide ring having a plurality of pairs of spaced-apart inwardly extending resilient fingers each pair of fingers overlying said one side of a corresponding valve for biasing said valves to their respective seated positions, and providing therebetween a separate chosen path of movement for one of said valve stems, a rotatable cam member within said chamber, said cam member being rotatable on an axis coincident with the central axis of said casing sections and having a cam lobe thereon, said cam lobe cooperating successively with said valve stems to cause each individual valve to be successively unseated against the bias of a corresponding pair of fingers in response to rotary movement of said cam member whereby the stem of the corresponding valve is constrained to move in its respective chosen path thereby tilting the valve on its corresponding seat to an unseated position, and means connected to said cam member to rotate said cam member to different operating positions in each of which positions a corresponding one only of said valves is unseated.

6. A multi-position control valve device, as claimed in claim 5, further characterized in that one of said pair of casing sections has a skirt extending therefrom for holding said guide ring in an assembled position.

7. A multi-position control valve device, as claimed in claim 5, further characterized in that the lobe on said cam member is provided with a detent recess for receiving therein one at a time the stems of said valves when the corresponding valve is moved to its unseated position by said lobe for yieldingly holding said cam member against movement.

8. A multi-position control valve device, as claimed in claim 5, further characterized in that said casing sections are provided with coaxial bores, and in that said means for rotating the cam member comprises a shaft rotatably mounted in the coaxial bores in said casing sections, and an operating handle removably secured on said shaft exteriorly of said casing sections for turning said shaft, said cam member being secured on said shaft so as to be rotated by turning movement of said handle.

9. A multi-position selector control valve device, as claimed in claim 5, further characterized in that said cam ring rotating means comprises a shaft rotatably mounted in said sectionalized casing, upon which shaft said cam member is mounted so as to be rotated with said shaft to cause said valves to be unseated one at a time, and further comprising fluid pressure operated power means for effecting rotation of said shaft, and multi-position manually operated valve means for selectively controlling said power means to effect rotation of said shaft selectively to any one of said valve unseated positions.

10. A multi-position selector control valve device, as claimed in claim 5, further characterized in that said cam ring rotating means comprises a shaft rotatably mounted in said sectionalized casing, upon which shaft said cam member is mounted so as to be rotated with said shaft to cause said valves to be unseated one at a time, and further comprising a ratchet wheel mounted on said shaft, a pawl for operative engagement with said ratchet wheel, an electric solenoid having a coil and an armature, said armature being operatively connected to said pawl, a spring for biasing said armature to one position, a source of electric power, and manually operated switch means for selectively controlling the supply of electric power to the coil of said electric solenoid whereby the supply and cut-off of power to said coil in cooperation with said spring operates said pawl to said one position and to another position to effect rotation of said ratchet wheel and said shaft to successively unseat said valves one at a time.

11. A multi-position selector control valve device, comprising in combination, cylindrical casing means having a chamber provided with a port opening into said chamber and with a surface in which are a plurality of valve seats arranged in a circle about a central axis of said cylindrical casing means from which valve seats respectively extend a plurality of outlet passageways, a plurality of valves each having a valve stem, one valve being mounted on each valve seat and operable to either a fluid pressure supplying position or to a fluid pressure cut-off position, a shaft journaled in said casing means and extending through said chamber, a cam member having a lobe and being mounted on said shaft within said chamber, an operating handle mounted on said shaft exteriorly of said cylindrical casing means and movable successively to a plurality of operating positions whereby movement of said handle from one to another of its operating positions causes rotary movement of said shaft and cam member to corresponding different rotary positions in each of which one of said valves is unseated, and guide means providing a plurality of radially arranged paths in each of which the stem of a corresponding valve moves, each of said paths preventing operating movement of a corresponding valve stem to unseat the valve integral therewith except in a plane intersecting the axis of said shaft and the axis of said corresponding valve stem.

References Cited in the file of this patent

UNITED STATES PATENTS

| | | |
|---|---|---|
| 1,345,772 | Hibner | July 6, 1920 |
| 1,997,977 | Petersen | Apr. 16, 1935 |
| 2,219,982 | Dawney | Oct. 29, 1940 |
| 2,675,830 | Vuillemen | Apr. 20, 1954 |
| 2,866,478 | Hyde | Dec. 30, 1958 |